US009696774B2

(12) United States Patent
Han et al.

(10) Patent No.: US 9,696,774 B2
(45) Date of Patent: Jul. 4, 2017

(54) METHOD AND APPARATUS FOR CONTROLLING POWER SUPPLY

(71) Applicants: Samsung Electronics Co., Ltd., Suwon-si, Gyeonggi-do (KR); Seoul National University R&DB Foundation, Seoul (KR)

(72) Inventors: Se-Hee Han, Seoul (KR); Joo-Yeol Lee, Seongnam-si (KR); Yong-Tae Yoon, Seoul (KR); Young-Gyu Jin, Seoul (KR); Hyeong-Ig Kim, Seoul (KR); Si-Young Lee, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 673 days.

(21) Appl. No.: 13/853,613

(22) Filed: Mar. 29, 2013

(65) Prior Publication Data
US 2013/0261825 A1 Oct. 3, 2013

(30) Foreign Application Priority Data

Mar. 30, 2012 (KR) .................. 10-2012-0033156

(51) Int. Cl.
| | | |
|---|---|---|
| G05D 11/00 | (2006.01) | |
| G06F 1/26 | (2006.01) | |
| G05B 13/02 | (2006.01) | |
| G06Q 10/06 | (2012.01) | |

(52) U.S. Cl.
CPC ............ *G06F 1/26* (2013.01); *G05B 13/024* (2013.01); *G06Q 10/06* (2013.01)

(58) Field of Classification Search
CPC .............................. G06F 1/26; G05B 13/024
USPC .................................................. 700/286, 291
See application file for complete search history.

(56) References Cited

U.S. PATENT DOCUMENTS

| | | | |
|---|---|---|---|
| 7,715,951 B2* | 5/2010 | Forbes, Jr. ............ | G01D 4/004 323/299 |
| 2010/0222935 A1 | 9/2010 | Forbes, Jr. et al. | |
| 2011/0071699 A1* | 3/2011 | Kim ...................... | G06Q 50/06 700/297 |
| 2011/0106328 A1* | 5/2011 | Zhou ................... | G05B 13/024 700/291 |

(Continued)

FOREIGN PATENT DOCUMENTS

| | | |
|---|---|---|
| EP | 2 403 183 A1 | 1/2012 |
| KR | 10-2011-0094617 A | 8/2011 |

*Primary Examiner* — Mohammad Ali
*Assistant Examiner* — Sheela S Rao
(74) *Attorney, Agent, or Firm* — Jefferson IP Law, LLP

(57) ABSTRACT

A demand response apparatus receives from a supply resource utilizing apparatus a signal indicating whether power supply from the demand response apparatus to the supply resource utilizing apparatus is possible, estimates a first power usage of the demand response apparatus for a first time interval, changes an operation of the demand response apparatus, estimates a second power usage for a second time interval after the changing of the operation of the demand response apparatus, calculates supply power available to the supply resource utilizing apparatus based on the estimated first power usage and the estimated second power usage, and transmits information about the available supply power to the supply resource utilizing apparatus.

16 Claims, 3 Drawing Sheets

(56) References Cited

U.S. PATENT DOCUMENTS

2012/0022709 A1    1/2012   Taylor
2012/0065792 A1    3/2012   Yonezawa et al.

* cited by examiner

METHOD AND APPARATUS FOR CONTROLLING POWER SUPPLY

PRIORITY

This application claims the benefit under 35 U.S.C. §119 (a) of a Korean patent application filed on Mar. 30, 2012 in the Korean Intellectual Property Office and assigned Serial No. 10-2012-0033156, the entire disclosure of which is incorporated herein by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) SAMSUNG ELECTRONICS CO., LTD., and the 2) SEOUL NATIONAL UNIVERSITY R&DB FOUNDATION.

BACKGROUND OF THE INVENTION

1. Field of the Invention

The present invention relates to a method and apparatus for controlling power supply. More particularly, the present invention relates to a method and apparatus for supplying some of the required supply power or additionally using some of the surplus power by estimating and adjusting power usage or power consumption.

2. Description of the Related Art

General power systems are operated such that power supply may be adjusted to correspond to power demand. For this purpose, a variety of power supply control techniques, such as a power demand forecasting technique, an economic load dispatch technique and an automatic load dispatching control technique, have been devised and used.

Power supply systems, also known as generators, are generally built in a large scale in consideration of the economy of scale, and the reliability and cost savings are considered as their primary operating criteria. In recent years, however, the demand for power has surged and a type of power load has changed significantly from linear loads, which are proportional to the frequency, to nonlinear loads such as digital devices. In addition, it is difficult to build existing large-scale power generation systems due to the site selecting and massive investment risks. Due to these situations, an interest in the role of the demand side has increased, in matching the demand and supply of power and operating the power systems reliably.

The general demand-side power supply resources include, for example, renewable energy resources, and demand response resources such as for example, power storage apparatuses and electric cars. These demand response resources may be part of an apparatuses that can adjust power usage, such as smart appliances. The renewable energy resources refer to solar or wind power generation apparatuses which are installed on a small scale at a home or in local areas. The power storage apparatus refers to an apparatus that can store power in advance and supply the stored power if necessary, like a battery. The electric car is similar to the power storage apparatus in terms of the principle of operation since it basically uses a battery. However, the electric car is distinguishable from the power storage apparatus installed in a fixed position, since the car has additional mobility. Apparatuses that can provide these demand-side power supply resources may match the demand and supply of power in the power system reducing the power usage if the power system lacks available supply power, and increasing the power usage if the power is oversupplied from the power system.

Among the apparatuses that can provide the demand-side power supply resources, a demand response apparatus capable of acquiring demand response resources may save power by reducing power usage by changing a reference value of its operation if the power system lacks power, thereby making it possible to supply power when necessary. In addition, the demand response apparatus may adjust its ongoing or scheduled operation in the time axis, thereby making it possible to secure the power it will supply in a time interval in which power is required.

In addition, if the power is oversupplied from the power system, the demand response apparatus may increase power usage by changing a reference value of its operation, or adjust its ongoing or scheduled operation in the time axis, thereby increasing the power usage in the time interval where the power is oversupplied.

On the other hand, if the power system lacks power, the demand response apparatus may perform the following operation. As an example, if the demand response apparatus is an air conditioner, the demand response apparatus may reduce the power usage by changing the set temperature, which is a reference value of its operation, to 27° C. from 25° C., and supply the power that is acquired to correspond to the reduced power usage. As another example, if the demand response apparatus is a washing machine, the demand response apparatus may delay the dehydration operation, which is a reference value of its operation, by 20 minutes, to thereby acquire the power required for dehydration for the delayed 20 minutes.

In this way, conventionally, the demand response apparatus may control power supply by decreasing or increasing the power usage. However, no technical measures have been provided to determine in which way the demand response apparatus should receive a signal indicating the need for power supply, to determine in which way the apparatus should measure the available supply power, to determine in which format the apparatus can represent information about the available supply power, and to provide an interface for allowing users to set an operation of the demand response apparatus in a specific way.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for controlling power supply.

Another aspect of the present invention is to provide a method and apparatus for acquiring available supply power by reducing power usage, additionally using power, and/or adjusting an operation in a time axis.

Another aspect of the present invention is to provide a method and apparatus for configuring information about available supply power in a predetermined format and transmitting the configured information.

In accordance with an aspect of the present invention, a method for controlling power supply in a demand response apparatus is provided. The method includes receiving from a supply resource utilizing apparatus a signal indicating whether power supply from the demand response apparatus to the supply resource utilizing apparatus is possible, estimating a first power usage of the demand response apparatus for a first time interval, changing an operation of the demand response apparatus, estimating a second power usage for a second time interval after the changing of the operation of the demand response apparatus, calculating supply power available to the supply resource utilizing apparatus based on the estimated first power usage and the estimated second power usage, and transmitting information about the available supply power to the supply resource utilizing apparatus.

In accordance with another aspect of the present invention, a demand response apparatus is provided. The apparatus includes a transceiver for receiving from a supply resource utilizing apparatus a signal indicating whether power supply from the demand response apparatus to the supply resource utilizing apparatus is possible, and a controller for estimating a first power usage of the demand response apparatus for a first time interval, for changing an operation of the demand response apparatus, for estimating a second power usage for a second time interval after the changing of the operation of the demand response apparatus, for calculating supply power available to the supply resource utilizing apparatus based on the estimated first power usage and the estimated second power usage, and for controlling the transceiver to transmit information about the available supply power to the supply resource utilizing apparatus.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
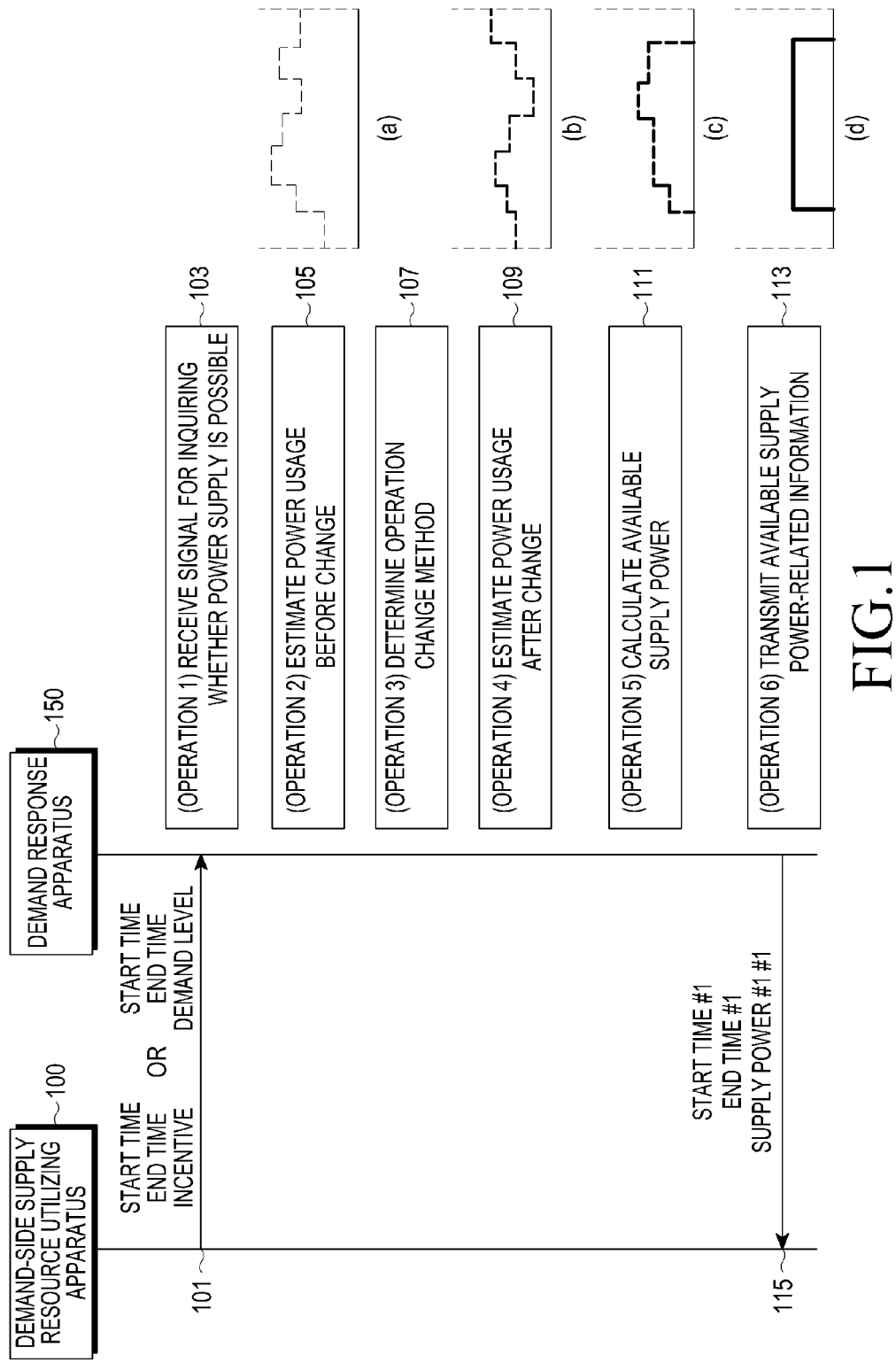
FIG. 1 illustrates a process of estimating and adjusting power usage according to an exemplary embodiment of the present invention.

FIG. 1 illustrates a process of estimating and adjusting power usage according to an exemplary embodiment of the present invention.

Referring to FIG. 1, a demand-side supply resource utilizing apparatus 100 transmits a signal for inquiring whether power supply is possible, to a demand response apparatus 150 in step 101. Information about the demand response apparatus 150 may be stored in advance in a Database (DB) of the demand-side supply resource utilizing apparatus 100 through a previous registration procedure. The demand response apparatus 150 may communicate with the demand-side supply resource utilizing apparatus 100 using a variety of wired/wireless communication networks such as wired/wireless public networks, private networks, and short-range wireless communication networks (for example, Zigbee).

In step 103, the demand response apparatus 150 receives the signal for inquiring whether power supply is possible. The signal for inquiring whether power supply is possible, includes 'start time', 'end time', and 'incentive', or includes 'start time', 'end time' and 'demand level'.

The 'start time' represents the start time for the supply of the power requested by the demand-side supply resource utilizing apparatus 100, and the 'end time' represents the end time for the supply of the power requested by the demand-side supply resource utilizing apparatus 100. For example, if the demand-side supply resource utilizing apparatus 100 needs power of 10 MW from 1 PM to 2 PM on Dec. 20, 2012, the 'start time' may be set as '2012/20/13:00:00' and the 'end time' may be set as '2012/12/20/14:00:00'.

In addition, the 'demand level' represents, a value indicating the risk in matching the demand and supply of the required power, a difference between the power consumed in the demand-side supply resource utilizing apparatus 100 and the power supplied to the demand-side supply resource utilizing apparatus 100, meaning that the higher the demand level, the larger the difference between the demand and supply of power. In other words, the larger the required amount of power, the higher the demand level. The 'incentive' refers to the cost that the demand-side supply resource utilizing apparatus 100 pays per unit power. The larger the required amount of power, the larger the incentive. For example, as for 10 MW, which is the required amount of power, it may be represented as 'incentive=100 won/kWh' or 'demand level=3'.

The 'incentive' may be used when the side utilizing demand-side power supply resources (for example, the demand-side supply resource utilizing apparatus 100) should pay a predetermined cost to the side providing demand-side power supply resources (for example, the demand response apparatus 150) as the utilizing side and the providing side have a contractual relationship. The 'demand level' may be used when there is a need to provide the demand-side power supply resources even without the payment of the cost, as the utilizing side and the providing side have a trust relationship.

In step 105, the demand response apparatus 150 estimates the power usage-before-operation change, based on the information included in the signal for inquiring whether power supply is possible. In other words, the demand response apparatus 150 estimates the power usage for the case where the demand response apparatus 150 operates originally regardless of its need for power supply. Since the power usage cannot be estimated in real time, the power usage may be estimated at intervals of a predetermined time such as 1 minute or 1 second. The power usage must be estimated in a period between the start time and the end time, and may be additionally estimated in the other time period.

In step 107, the demand response apparatus 150 determines an operation change method for the demand response apparatus 150 based on the estimated power usage. Specifically, the demand response apparatus 150 determines whether to reduce or increase the power usage by changing a reference value of its operation, and to adjust its ongoing or scheduled operation in the time axis. The demand response apparatus 150 may change a reference value of its operation or adjust its operation depending on the criteria set in advance in the demand response apparatus 150 or the criteria set by the user.

For example, assuming that the demand response apparatus 150 is an air conditioner, the preset criteria may the criteria for increasing the set temperature by 1° C. if the incentive is less than 100 won/kWh, and increasing the set temperature by 2° C. if the incentive is greater than 100 won/kWh. Assuming that the user attaches greater importance to the utility of the air conditioner (for example, coolness) than the cost, the demand response apparatus 150 may receive the criteria (which is for increasing the set temperature by 1° C. if the incentive is less than 200 won/kWh, and increasing the set temperature by 2° C. if the incentive is greater than 200 won/kWh), from the user through a user interface provided by the demand response apparatus 150. Similarly, the operation method of the demand response apparatus 150 may be set differently depending on the value of the demand level.

In step 109, the demand response apparatus 150 estimates the power usage-after-operation change. The method of estimating the power usage in step 109 is similar to the method used in step 105. Therefore, the demand response apparatus 150 may estimate the power usage at intervals of a predetermined time.

In step 111, the demand response apparatus 150 calculates available supply power. Specifically, the demand response apparatus 150 calculates a difference between the power usage-before-operation change ((a) in FIG. 1) estimated in step 105 and the power usage-after-operation change ((b) in FIG. 1) estimated in step 109, and represents the calculated difference as the power usage ((c) in FIG. 1) at intervals of a predetermined time. For example, the estimated power usage-before-operation change is represented as (a) in FIG. 1 and the estimated power usage-after-operation change is represented as (b) in FIG. 1, the available supply power may be determined as (c) in FIG. 1.

In step 113, the demand response apparatus 150 transmits information related to the available supply power. The information related to the available supply power includes information about 'start time' indicating the time the power supply starts, 'end time' indicating the time the power supply ends, and 'supply power' indicating the amount of the power that is supplied in a period between the start time and the end time.

The available supply power determined in step 111 varies at intervals of a predetermined time. Accordingly, there is a need to perform a process of simplifying the determined available supply power as shown in (d) of FIG. 1.

For example, the process may be performed based on the average of the total supply power. This process may be used if the deviation of power in each time interval is insignificant, but may adversely affect the stability of the power system by providing wrong information to the demand-side supply resource utilizing apparatus 100 if the deviation of power in each time interval is significant.

Therefore, a new method can be used that simply determines the available supply power as an approximate value, and determines an operation change method corresponding to the determined approximate value after returning to step 107. Steps 107 to 113 are repeated until the determined approximate value corresponds to the operation change method, thereby making it possible to match the amount of power that is actually supplied by the demand response apparatus 150, to the power supply-related information transmitted to the demand-side supply resource utilizing apparatus 100.

Although not illustrated in FIG. 1, the demand response apparatus 150 may receive a signal indicating the acceptance or rejection of the power supply from the demand-side supply resource utilizing apparatus 100 after step 113. Upon receiving a signal indicating the acceptance of the power supply from the demand-side supply resource utilizing apparatus 100, the demand response apparatus 150 reduces or increases the power usage by changing its operation as scheduled at step 115. Upon receiving a signal indicating the rejection of the power supply, the demand response apparatus 150 performs the operation before step 101 without changing the operation.

It the power is insufficient, the available supply power may have a positive (+) value indicating that the demand response apparatus 150 will reduce the power usage in the demand-side supply resource utilizing apparatus 100, or indicating that the demand response apparatus 150 supplies its stored power. If the power is oversupplied, the available supply power may have a negative (−) value indicating that the demand response apparatus 150 will increase the power usage in the demand-side supply resource utilizing apparatus 100. In other words, collecting power at the demand-side supply resource utilizing apparatus 100 may include both that the demand-side supply resource utilizing apparatus 100 receives supply power and that the demand-side supply resource utilizing apparatus 100 receives more supply power.

Figure 2:
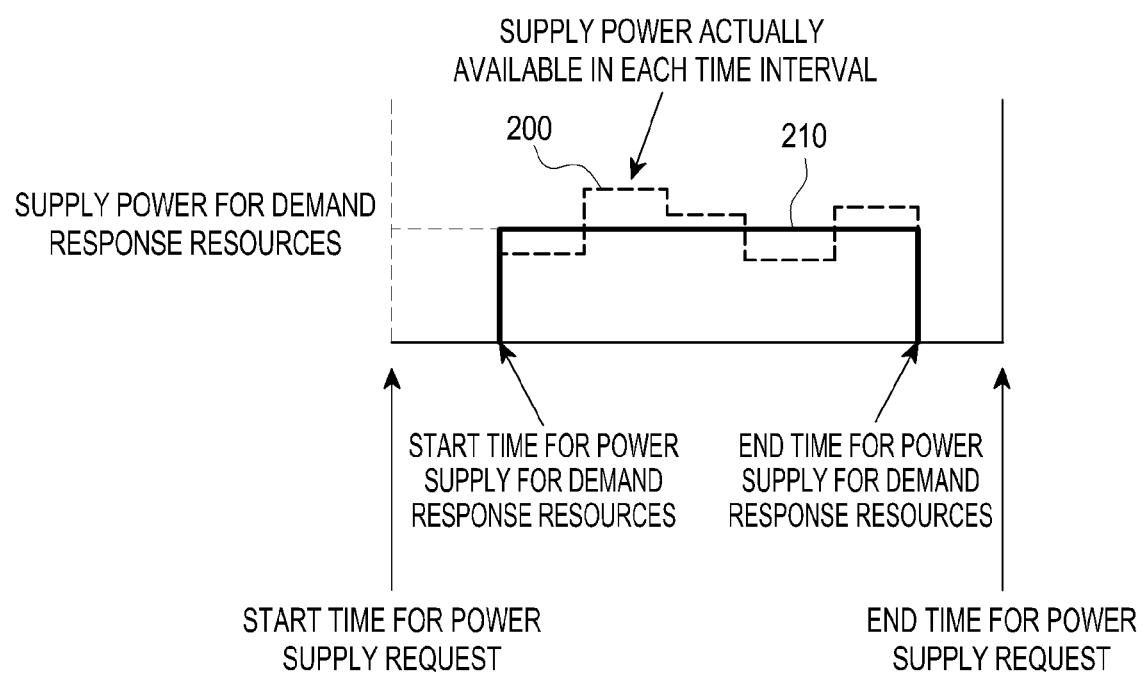
FIG. 2 is a graph illustrating the simplified available supply power according to an exemplary embodiment of the present invention.

FIG. 2 is a graph illustrating the simplified available supply power according to an exemplary embodiment of the present invention.

Referring to FIG. 2, the demand response apparatus 150 calculates available supply power in step 111 in FIG. 1. The calculated available supply power may be represented by reference numeral 200. The calculated available supply power may be represented as the amount of power, which is supplied in a period between the start time the demand-side supply resource utilizing apparatus 100 requested the power supply and the end time the demand-side supply resource utilizing apparatus 100 requested to stop the power supply, and in a period between the time the demand response apparatus 150 actually starts the power supply and the time the demand response apparatus 150 stops the power supply.

As shown by reference numeral 200, the calculated available supply power has a different value in each time interval. Therefore, the demand response apparatus 150 calculates an average of the calculated available supply power, and determines the calculated average as the amount of power the demand response apparatus 150 will actually supply. As a result, the curve 200 is converted into a curve 210. In other words, the available supply power may be simplified to the average value.

Figure 3:
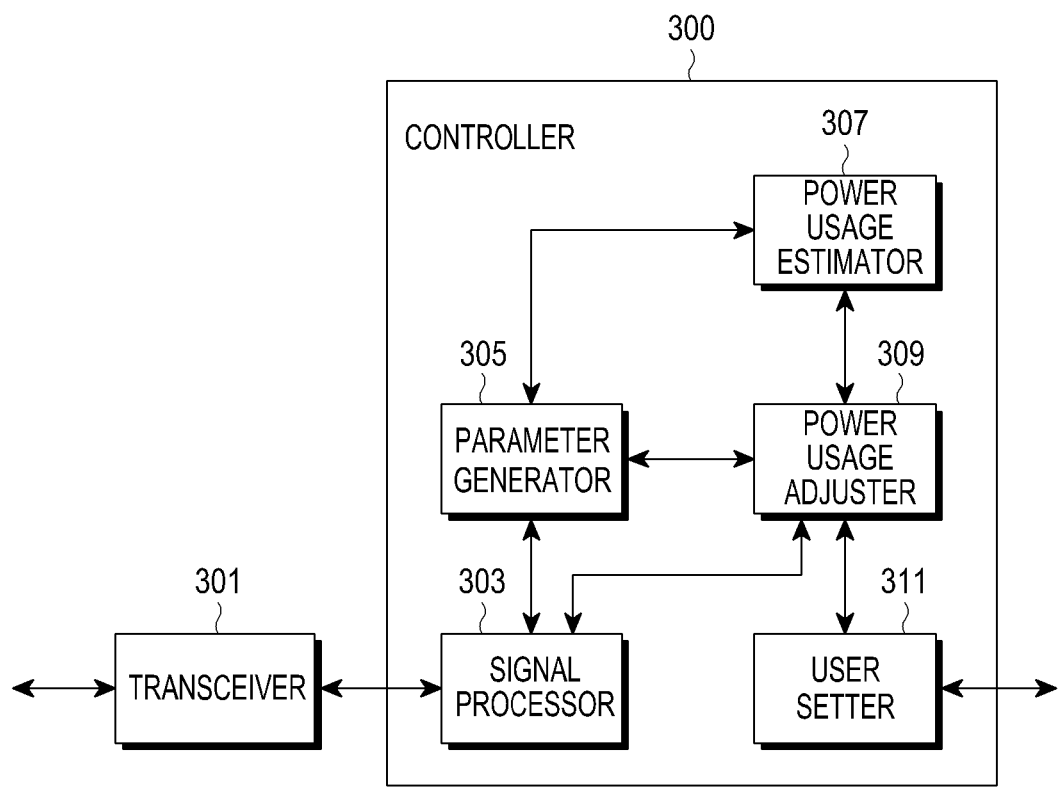
FIG. 3 is a block diagram of a demand response apparatus according to an exemplary embodiment of the present invention.

FIG. 3 is a block diagram of a demand response apparatus according to an exemplary embodiment of the present invention.

Referring to FIG. 3, the demand response apparatus 150 includes a controller 300 and a transceiver 301.

The transceiver 301 receives a signal for inquiring whether power supply is possible, from the demand-side supply resource utilizing apparatus 100, and transmits information related to the available supply power to the demand-side supply resource utilizing apparatus 100.

The controller 300 controls the overall operation of the demand response apparatus 150, and includes a signal processor 303, a parameter generator 305, a power usage estimator 307, a power usage adjuster 309, and a user setter 311. Although the controller 300 is assumed to include a plurality of components in FIG. 3, the controller 300 may also be a single physical component for performing Operations 1 to 6 illustrated in FIG. 1.

The signal processor 303 analyzes received signals and generates transmission signals. The power usage estimator 307 estimates the power usage-before-operation change for the demand response apparatus 150 and the power usage-after-operation change for the demand response apparatus 150.

The power usage adjuster 309 determines the operation change method for the demand response apparatus 150. The parameter generator 305 determines the available supply power based on the power usage-before-operation change for the demand response apparatus 150 and the power usage-after-operation change for the demand response apparatus 150, and generates information related to the determined available supply power. The user setter 311 receives the criteria for determining the operation change method, from the user.

As is apparent from the foregoing description, the present invention makes it possible to utilize the demand response apparatuses, which are distributed demand-side power supply resources, without collecting detailed information about various demand-side power supply resources, and without establishing and directly controlling the development plans for a plurality of demand-side power supply resources, which are practically almost impossible.

In addition, aspects of the present invention may provide the technical foundation in which the infrastructure of the power system may be utilized practically and effectively, when the environment, in which elements of the power system may exchange information over the wire/wireless communication network, is provided as a smart grid is built, and when many demand-side power supply resources are secured, which will be spread by the continuous technology development and policy support, though they are not currently activated like the demand response apparatuses.

While the aspects of the present invention have been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling power supply, the method comprising:
   receiving, by a demand response apparatus from a supply resource utilizing apparatus, a signal requesting a power supply from the demand response apparatus, wherein the demand response apparatus is configured to consume different power usage depending on an operation of the demand response apparatus, and the signal includes a start time and an end time when the power supply is required, and one of an incentive indicating a cost being paid per unit power and a demand level indicating a difference between an amount of power being demanded and an amount of power being supplied;
   estimating a first power usage to be consumed by an ongoing or scheduled operation of the demand response apparatus for a first time interval based on the received signal, wherein the first time interval comprises a time interval from the start time to the end time;
   determining to adjust the ongoing or scheduled operation of the demand response apparatus based on one of the incentive and the demand level;
   estimating a second power usage to be consumed by the adjusted operation of the demand response apparatus for the first time interval;
   calculating an available power supply to be saved by the demand response apparatus based on the estimated first power usage and the estimated second power usage;
   transmitting, by a demand response apparatus, information about the available power supply to the supply resource utilizing apparatus; and
   adjusting the ongoing or scheduled operation of the demand response apparatus based on the determining result,
   wherein the information about the available power supply comprises a start time and an end time of a second time interval included in the first time interval, and a plurality of available power supply values corresponding to a plurality of intervals in the second time interval.

2. The method of claim 1, wherein the incentive is used to determine the adjusting of the ongoing or scheduled operation of the demand response apparatus.

3. The method of claim 1, wherein the demand level is used to determine the adjusting of the ongoing or scheduled operation of the demand response apparatus.

4. The method of claim 1, wherein the adjusting of the ongoing or scheduled operation of the demand response apparatus comprises switching to an operation of reducing or increasing a power usage of the demand response apparatus.

5. The method of claim 1, wherein the adjusting of the ongoing or scheduled operation of the demand response apparatus comprises a change of at least one of the ongoing operation or the scheduled operation to reduce or increase a power usage of the demand response apparatus for the first time interval.

6. The method of claim 1, wherein the adjusting of the ongoing or scheduled operation of the demand response apparatus comprises switching to an operation selected by a user.

7. The method of claim 1, further comprising receiving, from the supply resource utilizing apparatus, at least one of an accept message indicating acceptance of the available power supply and a reject message indicating rejection of the available power supply.

8. The method of claim 1, wherein the demand response apparatus is configured to exchange signals with the supply resource utilizing apparatus over a wired and/or wireless communication network.

9. A demand response apparatus configured to consume different power usage depending on an operation, the demand response apparatus comprising:
a transceiver configured to receive, from a supply resource utilizing apparatus, a signal requesting a power supply from the demand response apparatus, wherein the signal includes a start time and an end time when the power supply is required, and one of an incentive indicating a cost being paid per unit power and a demand level indicating a difference between an amount of power being demanded and an amount of power being supplied; and
a controller configured to:
estimate a first power usage to be consumed by an ongoing or scheduled operation of the demand response apparatus for a first time interval based on the received signal, wherein the first time interval comprises a time interval from the start time to the end time,
determine to adjust the ongoing or scheduled operation of the demand response apparatus based on one of the incentive and the demand level,
estimate a second power usage to be consumed by the adjusted operation of the demand response apparatus for the first time interval,
calculate an available power supply to be saved by the demand response apparatus based on the estimated first power usage and the estimated second power usage,
control the transceiver to transmit information about the available power supply to the supply resource utilizing apparatus, and
adjust the ongoing or scheduled operation of the demand response apparatus based on the determining result,
wherein the information about the available power supply comprises a start time and an end time of a second time interval included in the first time interval, and a plurality of available power supply values corresponding to a plurality of intervals in the second time interval.

10. The demand response apparatus of claim 9, wherein the incentive is used to determine to adjust the ongoing or scheduled operation of the demand response apparatus.

11. The demand response apparatus of claim 9, wherein the demand level is used to determine to adjust the ongoing or scheduled operation of the demand response apparatus.

12. The demand response apparatus of claim 9, wherein the controller is further configured to switch to the ongoing or scheduled operation of reducing or increasing the power usage of the demand response apparatus.

13. The demand response apparatus of claim 9, wherein the controller is further configured to change at least one of the ongoing operation or the scheduled operation to reduce or increase power usage of the demand response apparatus for the first time interval.

14. The demand response apparatus of claim 9, wherein the controller is further configured to switch to the ongoing or scheduled operation selected by a user.

15. The demand response apparatus of claim 9, wherein the transceiver is configured to receive, from the supply resource utilizing apparatus, at least one of an accept message indicating acceptance of the available power supply and a reject message indicating rejection of the available power supply.

16. The demand response apparatus of claim 9,
wherein the transceiver is further configured to exchange signals with the supply resource utilizing apparatus over a wired and/or wireless communication network.

* * * * *